(12) United States Patent
Lewis et al.

(10) Patent No.: US 8,473,443 B2
(45) Date of Patent: Jun. 25, 2013

(54) INAPPROPRIATE CONTENT DETECTION METHOD FOR SENDERS

(75) Inventors: Sheena Lewis, Chicago, IL (US); Peter K. Malkin, Ardsley, NY (US); Kenya F. Oduor, Morrisville, NC (US); Philippa M. Rhodes, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 12/426,523

(22) Filed: Apr. 20, 2009

(65) Prior Publication Data
US 2010/0268682 A1 Oct. 21, 2010

(51) Int. Cl.
G06F 17/00 (2006.01)
G06F 17/20 (2006.01)
G06F 17/21 (2006.01)
G06F 17/22 (2006.01)
G06F 17/24 (2006.01)
G06F 17/25 (2006.01)
G06F 17/26 (2006.01)
G06F 17/27 (2006.01)
G06F 17/28 (2006.01)
G06N 5/02 (2006.01)

(52) U.S. Cl.
USPC ............... 706/47; 706/54; 715/257; 715/265

(58) Field of Classification Search
None
See application file for complete search history.

(56) References Cited

U.S. PATENT DOCUMENTS

| | | | |
|---|---|---|---|
| 5,796,948 A | 8/1998 | Cohen | |
| 5,835,722 A | 11/1998 | Bradshaw et al. | |
| 6,085,206 A * | 7/2000 | Domini et al. | 715/257 |
| 6,782,510 B1 * | 8/2004 | Gross et al. | 715/257 |
| 7,058,586 B1 * | 6/2006 | Law | 705/5 |
| 7,818,764 B2 * | 10/2010 | Matz | 725/34 |
| 7,950,064 B2 * | 5/2011 | Chavez et al. | 726/28 |
| 2005/0203800 A1 * | 9/2005 | Sweeney et al. | 705/14 |
| 2006/0247914 A1 * | 11/2006 | Brener et al. | 704/1 |
| 2008/0052272 A1 * | 2/2008 | Altaf et al. | 707/3 |
| 2008/0109214 A1 | 5/2008 | Shaw | |

* cited by examiner

Primary Examiner — Kakali Chaki
Assistant Examiner — Daniel Pellett
(74) Attorney, Agent, or Firm — Scully, Scott, Murphy & Presser, P.C.

(57) ABSTRACT

Content detection for senders reviews and compares content for sending to one or more profile parameters of a recipient. The one or more profile parameters describe the characteristics of the recipient. Portions of the content determined to be inappropriate or offensive to the recipient based on the recipient's profile parameters are tagged and the sender is alerted. Alternative suggestions to replace those portions in the content may be provided.

25 Claims, 7 Drawing Sheets

| User ID | Protocol | Profile User ID |
|---|---|---|
| JohnEDoe@foo.com | SMTP | 987 |
| JohnnyDoe | Instant Messaging | 987 |
| JaneEDoe@bca.com | SMTP | 123 |
| MsD | Instant Messaging | 123 |

Fig. 4

| Characteristic ID | Element Type | Value | Replacements | Explanation |
|---|---|---|---|---|
| Man | Text | "boy" | "man" | Demeaning, and should only be used to refer to a child. |
| Woman | Text | "girl" | "woman", "lady" | Demeaning, and should only be used to refer only to a child. |
| Novice Programmer | Text | "GC" | "garbage collection" | Acronym which is only well known by experienced programmers |
| Novice Programmer | Image | [Image of cloud] | [Image of cloud including "Network"] | Iconic image which is only well known by experienced programmers |
| Novice Programmer | Audio | "nubie" | "novice" | Demeaning nickname |

Fig. 6

| Characteristic ID 810 | Override Characteristic ID 820 | Element Type 830 | Value 840 | Replacements 850 | Explanation 860 |
|---|---|---|---|---|---|
| Novice Programmer | | Text | "GC" | "garbage collection" | Acronym which is only well known by experienced programmers |
| Novice Programmer | | Image | [Image of cloud] | [Image of cloud including "Network"] | Iconic image which is only well known by experienced programmers |
| Novice Programmer | Novice Programmer | Audio | "nubie" | "novice" | Demeaning nickname |

Fig. 7

INAPPROPRIATE CONTENT DETECTION METHOD FOR SENDERS

FIELD OF THE INVENTION

The present disclosure generally relates to computer system programming languages, compilers, interpreters and tools, and more particularly to detecting types of content.

BACKGROUND OF THE INVENTION

In the past, businesses were limited to consumers of goods and services in their locale or local geography typically in person. In face-to-face (F2F) communication, the senders and receivers in a conversation are capable of seeing and hearing the people they are talking to. F2F communication may prevent one from saying something inappropriate or embarrassing in some cases because they can more easily identify a receiver's ethnicity, gender, special need, etc. F2F communication also permits the use of verbal (e.g., inflection, pitch, etc.) and non-verbal cues (e.g., facial expression, proximity, etc.) to interpret tone, emotion, urgency, etc.

Companies now more than ever are conducting business globally and often using electronic communication means such as e-mails, text messages and live chat sessions. Communication methods that are not in person, like electronic mail or text messages may be subject to misinterpretation because of differences in the culture and dialects of the sender and receiver and the means to convey emotion that one intends to communicate across are limited.

Consider the following scenario. Joe Smith is the lead project manager (PM) on a global project with a team in China. Joe is sending Yao, the PM in China, a note regarding the stipulations for hiring contractors for the project. In his email, Joe comments on how they need to be very explicit in defining the terms of the amount of work contractors can do per week for fear that they will go "belly up" if given too much work over the duration of the contract. Yao looks up the phrase "belly up", for example through Google™, to get a definition of what is to Yao an unfamiliar phrase. Wiktionary™, for example, returns the following results:

Adjective:
  1. (idiomatic) Dead or defunct, often used with go, went, or turn.
     After several financial failures, the organization went belly up.

Verb:
  1. (idiomatic) To gather close to, or approach eagerly or assertively, as a bar for ordering alcoholic drinks.
     He bellied up to the bar as soon as he saw a free stool.

From the above results, Yao immediately phones Joe to discuss the contractual terms for fear that they may put lives at risk. Joe answers Yao's call and after hearing Yao's concerns they laugh it off and Joe explains the meaning of this American expression. The above presented an example of a scenario that ended well. In other cases, one may end up offending the other side, which can be costly particularly in a delicate situation.

BRIEF SUMMARY OF THE INVENTION

A system and method for detecting content are disclosed. The system, in one aspect, may comprise an input device for inputting content to be sent to one or more recipients via a communications network. The system may also include a profile database having one or more profiles associated with at least one of the one or more recipients. Each profile of the one or more profiles has at least one profile characteristic describing a respective recipient. A reviewing module may be operable to determine at least one recipient profile characteristic associated with a recipient of the content from said one or more profiles. A comparison module may be operable to scan the content, determine one or more criteria based on said at least one recipient profile characteristic, and identify one or more content items in the content meeting said one or more criteria. The system may also include an alert module operable to raise an alarm in response to the comparison module identifying said one or more content items.

A method for detecting content, in one aspect, may comprise determining at least one recipient profile characteristic associated with a recipient of electronic content, by retrieving one or more profiles stored in a profile database associated with one or more recipients. The method may also include determining one or more criteria based on said at least one recipient profile characteristic. The method may further include scanning the content and identifying one or more content items in the content meeting said one or more criteria, The method may yet farther include raising an alarm in response to the identifying of said one or more content items.

A program storage device readable by a machine, tangibly embodying a program of instructions executable by the machine to perform a method for detecting content may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 4 displays sample content of a database table that may be included as part of the system of the present disclosure.

FIG. 6 displays sample content of a characteristics database table that may be included as part of the system of the present disclosure in one embodiment.

FIG. 7 displays sample content of a characteristics database table that may be included as part of the system of the present disclosure in another embodiment.

DETAILED DESCRIPTION

As more companies carry on business globally, people need to be more cognizant of the cultural sensitivity, dialect, and tone of their electronic communications. In the present disclosure, a system and method is provided for tagging words or phrases that may be culturally offensive, dialect specific, or inappropriate in tone before the electronic transmission of the content to a receiver. The system and method help one avoid sending content to a receiver that may cause a negative response or emotion or be misunderstood, or the content that otherwise should not be sent to the receiver. Unlike the known techniques, the system and method of the present disclosure can be extended to include user defined input or parameters about the receiver or that characterize the receiver as the relationship with the receiver develops and more is learned about them, such as ethnicity, religion, values, political views, and other characteristics. Inappropriate or offensive words or phrases or other content such as audio, graphics, images, and others, in electronic communications are tagged based on the characteristics of the receiver(s), and the sender can be given an explanation of why they should not be sent. One or more suggestions on how to make those offensive items appropriate for sending may be also provided.

Figure 1:
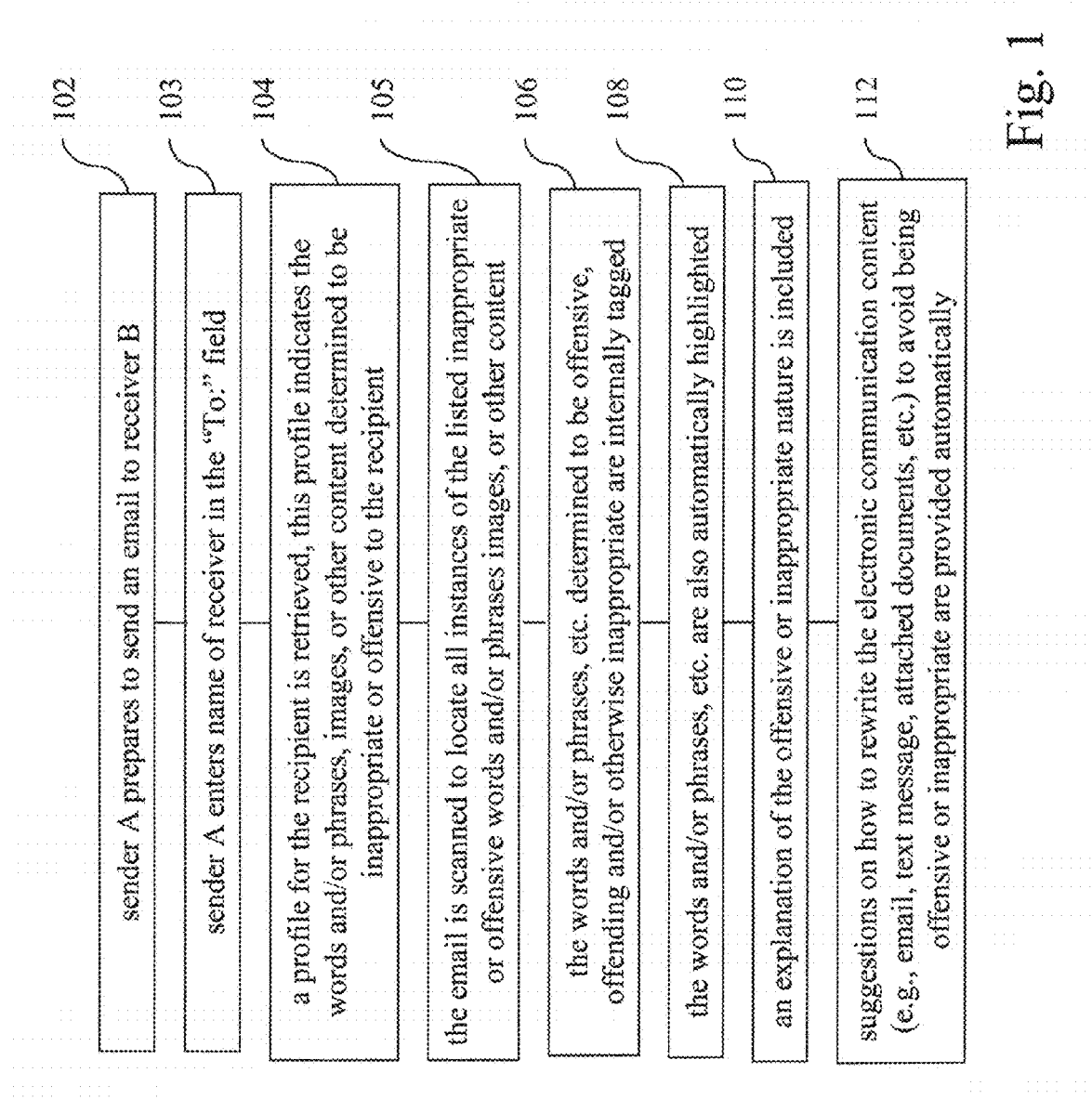
FIG. 1 is a flow diagram illustrating a scenario employing a method of the present disclosure in one embodiment.

FIG. 1 is a flow diagram illustrating a scenario employing a method of the present disclosure in one embodiment. While this example illustrates the method with reference to an email communication, any other communication types such as instant messaging, chat session, and others may apply to the method of the present disclosure. At 102, sender A prepares to send an email to receiver B. For example, at 103, sender A enters name of receiver in the "To:" field or the like in the email application system, and enters the content or attaches a content document. At 104, the profile for this recipient is retrieved (for example, from a database 210, for example, by the reviewing module 214 shown in FIG. 2). The database 210 and the reviewing module 214 are described in more detail with reference to FIGS. 2, 4, 5 and 6 below. For the given user, this profile may include a list of all words and contents that might be offensive or inappropriate, an explanation for why each of the listed elements might be offensive or inappropriate to the given user, and a list of one or more replacements for each offensive or inappropriate element, if a replacement (or set of replacements) exist.

At 105, the content of the email is automatically scanned or examined to locate the one or more words, phrases, and/or other content that would be considered offensive, offending and/or otherwise inappropriate to receiver B. At 106, the words, phrases and/or other content determined to be offensive, offending and/or otherwise inappropriate are internally tagged. In one embodiment of the method of the present disclosure, both steps 105 and 106 may be accomplished by a comparison module 216 or the like functionality, described below in detail with references to FIGS. 2, and 4-6.

At 108, those words, phrases, and/or other content are also automatically highlighted, for example, visually on the sender's display or like user interface so the sender is aware of them. Any other visual or audio and/or other cues may be used to alert the user of the words, phrases, and/or other content. At 110, for each tagged item in one embodiment, an explanation of the offensive or inappropriate nature may be included. At 112, suggestions on how to rewrite the electronic communication content (e.g., email, text message, attached documents, and/or the like) to avoid being offensive or inappropriate may be provided automatically. In one embodiment of the method of the present disclosure, steps 108, 110 and 112 may be accomplished by an alert module 218, described below in detail with references to FIGS. 2, and 4-6.

In addition to the text content, the system and method of the present disclosure may tag audio contents, pictures, graphics, illustrations, and/or the like that can include offensive or inappropriate content. Content that is too complicated or too small may be considered inappropriate to some recipients, for example, those requiring better vision, hearing, and/or the like. Content containing colors that a recipient cannot differentiate may be also considered as inappropriate. One embodiment providing this functionality is described below in detail with reference to FIGS. 2, and 4-6.

Content may be considered for race, ethnicity, gender, special needs (e.g., color blind, hearing or vision impaired, etc.), those with English as second language (ESL), relationship to others in address book or to sender, age, sexual orientation, political affiliation, and skill levels (e.g., a recipient may be very knowledgeable about computers and bicycles, but not about psychology or literature) and others. Consideration factors are not limited to those and may include others.

The sender's traits may also be known and considered. For example, the content that may not be offensive to someone who has a similar trait as the sender can be sent the electronic communication as it is. For example, although it would be inappropriate for a member of one given team or group to make a joke about the member of another group or team, it might be acceptable to make light of a member of one's own team. One embodiment providing this functionality is described in detail below with references to FIGS. 2, and 4, 5, and 7.

In addition to alerting the sender to the content that is inappropriate, suggestions may be made for alternatives that are considered to be appropriate. The choice of alternatives may be based on the characteristics of a recipient (e.g., offering less technical language for a nontechnical recipient, providing larger/clearer images if the recipient has vision problems, etc.)

Figure 2:
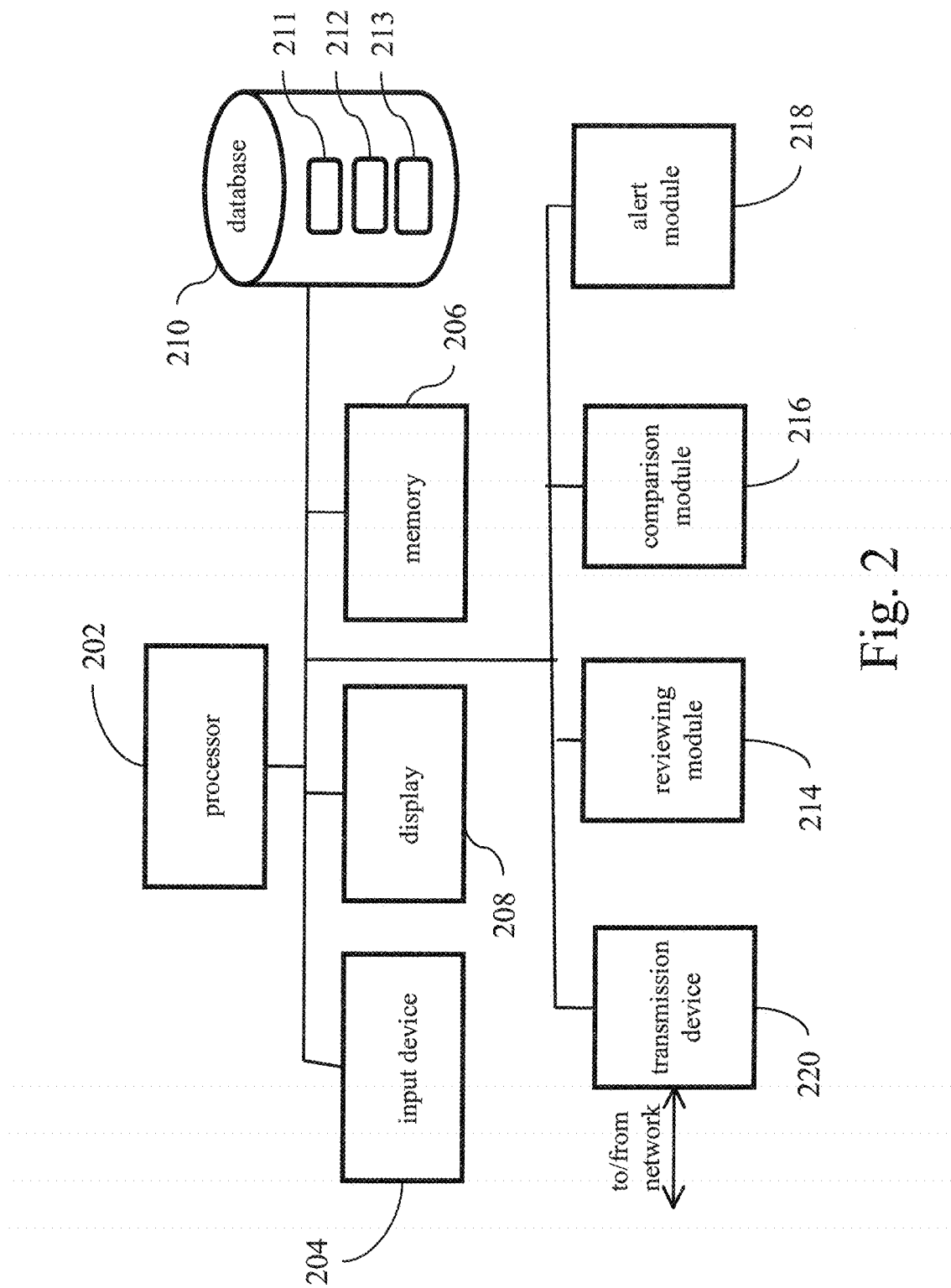
FIG. 2 is an architectural diagram illustrating the system of the present disclosure in one embodiment.

FIG. 2 is an architectural diagram illustrating system components of the present disclosure in one embodiment. The system may include one or more processors 202 for executing the functions or functionalities of the present disclosure. Using an input device 204 such as keyboard, mouse, touch screen functionalities or others, a user (e.g., a sender) may enter documents, text, graphics, pictures, or like to send electronically to a recipient. The system may also include one or more memory devices 206 for storing one or more modules or instructions implementing the functionalities of the present disclosure, for the processor 202 to execute. The system may also include a display device 208 for presenting user interfaces to a user.

A profile database 210 stores the profiles for each of one or more of the recipients. In one embodiment of the system of the present disclosure, these profiles may be stored using tables 211, 212 and 213, described below in detail with reference to FIGS. 4, 5 and 6, respectively. These descriptions include indication of how profiles can be added, deleted and modified. The database 210 may be locally or remotely connected to the processor 202. For each recipient, a profile may include a recipient's identifier identifying the recipient and a list of profile or characteristics associated with that recipient. New profile data may be added to the database, updated and/or deleted as new recipients are added and/or the characteristics of the recipients change.

Figure 5:
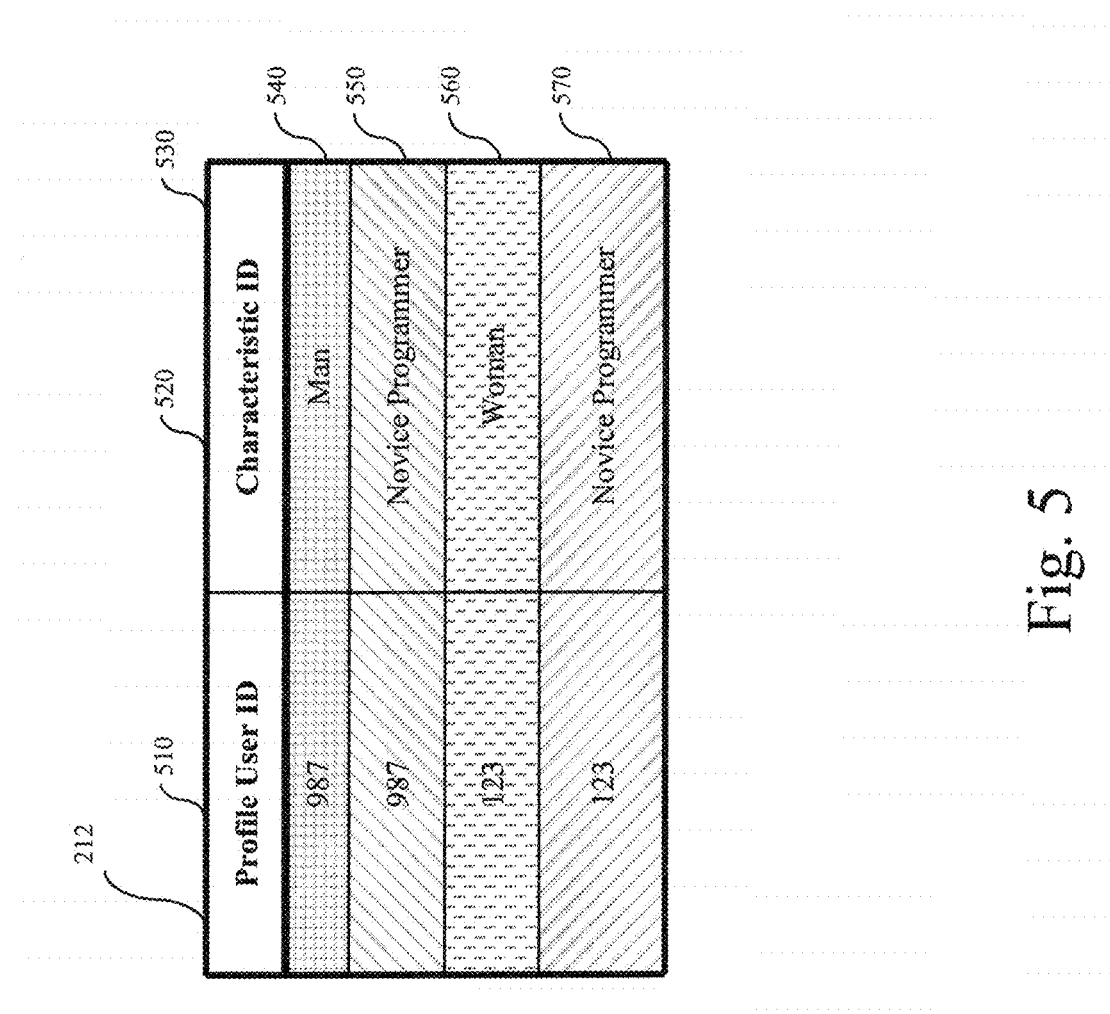
FIG. 5 displays another sample content of a database table that may be included as part of the system of the present disclosure.

FIGS. 4-6 illustrates one example of how database 210 is composed in one embodiment. FIG. 4 shows a table that cross-references protocol and application ID's with profile user ID's in one embodiment of the present disclosure. FIG. 4 shows table 211 from database 210 which cross-references the user ID's, listed in column 410 which might be used to indicate a given recipient in different applications or protocols, listed in column 420, cross-referencing these identifiers with profile user ID's, listed in column 430. As shown, the profile user ID "987" is associated with the SMTP (email) ID JohnEDoe@foo.com by row 440 and the Instant Messaging ID JohnnyDoe by row 450. Similarly, the profile user ID "123" is associated with SMTP ID JaneEDoe@bca.com by row 460 and the Instant Messaging ID MsD by row 470. Using these profile user ID's, the system and method of the present disclosure may use the same user configurations or information associated with the user referenced using different protocols. For example, profiles user ID "987" can support data sent using both the SMTP and Instant Messaging protocols. Additions, deletions and modifications of recipients may be handled by corresponding additions, deletion or modifications entry row of this table 211. For example, additional users, user ID's, protocols are reflected by adding a new row to the table 211; users, user ID's or protocols may be removed by deleting an existing row in the table 211; modifications to the user ID's and protocols, and the like may be made by modifying an existing row in the table 211.

FIG. 5 shows an example of a table 212 from the database 210 in one embodiment of the present disclosure, which may be used to cross-reference profile user ID's and characteristic ID's. The table 212 associates the profile user ID's listed in the profile user ID's column 510 with particular characteristics indicated by characteristic ID's listed in the characteristic ID column 520.

Examples of characteristics include but are not limited to one or more of the following: age, gender, nationality, language proficiency (e.g., fluent in Japanese, limited English), religion, level of expertise (this parameter including both level and category, e.g. expert in Java, novice in Prolog, no knowledge of real-world social skills), physical handicaps (e.g., blind, or color blind, cannot walk), positive personal event (e.g., graduated high school, or found job), negative personal event (e.g., death of close friend and/or relative, lost job).

As shown, profile ID 987 is associated with characteristic ID "Man" by row 540, and characteristic ID "Novice Programmer" in row 550. Similarly, profile user ID 123 is associated with characteristic ID "Woman" in row 560, and characteristic "Novice Programmer" in row 570.

In this example, in one embodiment, in order to add, delete and modify the characteristics associated with a given user, the user's profile user ID is associated with the one or more characteristic IDs. Additional characteristics may be implemented by inserting a new row to table 212 (e.g., the addition of a new row associating profile user ID "987" with the characteristic ID "husband" once that user with profile user ID "987" gets married). A user's characteristics may be removed by deleting an association that no longer is valid or applies to that user (e.g., the deletion of the row associating "987" with "husband" after the user with profile user ID "987" gets divorced). Similarly, a user's characteristics may be modified by changing the association data (e.g., replacing the characteristic ID "Novice Programmer" at 550 with "Intermediate Programmer" after the user associated with profile user ID "987" gains experience).

FIG. 6 shows an example of a table 213 (henceforth referred to as the characteristic table) in one embodiment of the present disclosure. The characteristic table cross-references characteristic ID's listed in the characteristic ID column 610, with for example, the type of the particular element—listed in the element type column 620, the element's value, listed in the value column 630, the possible replacement value, if any, listed in the replacements column 640, and an explanation why the given element is offensive or inappropriate, listed in the explanation column 650.

For example, as shown, row 660 indicates that for the characteristic ID "Man," the text value of "boy" should be replaced with the value "man" because the use of "boy" is "demeaning, and should only be used to refer to a child." Row 670 indicates that for the characteristic ID "Woman," the text value of "girl" should be replaced with the value "woman" or "lady" because the use of "girl" is "demeaning, and should only be used to refer to a child." Row 680 indicates that for the characteristic "Novice Programmer," the term "GC" should be replaced with "garbage collection" because "GC" is an "Acronym, only well known to expert programmers." Row 690 indicates that for the characteristic "Novice Programmer" the use of the image of a cloud to represent a network should be avoided because a cloud is an "Iconic image which is only well known by experienced programmers," and should be replaced be a cloud containing the word "Network."

While FIG. 6 shows one or more entries for each of characteristic ID's listed in column 610, any given characteristic could also have 0 (where there are no listed offensive or inappropriate elements related to the given characteristic ID).

To modify a given characteristic, one may add one or more new rows containing the new information for the given characteristic (i.e., element type, value, replacements and explanation), delete one or more rows containing information that is no longer valid, or modifies, changes or updates one or more values in existing rows. The rows relevant to a given characteristic are those associated with the characteristic's ID in the characteristic ID column 610.

While FIGS. 4-7 illustrate a table structure, it should be understood that any other data structure may be implemented and/or utilized in creating the associations of users and their characteristics, including but not limited to hierarchical data structures, tree-oriented structure, linked lists, and the like and/or others.

Referring back to FIG. 2, a reviewing module 214 or the like functionality receives content such as e-mail, document, text message, graphical messages, or the like, as entered by the sender and reviews the content to determine one or more content parameters in the content. For example, the reviewing module 214 or the like functionality may determine the identifier (ID) of the recipient (e.g., JanEDoe@abc.com) and the type of transmission (e.g. SMTP (email)), resolve the user profile ID associated with the ID of the recipient and protocol, for instance, using table 211 shown in FIG. 4 (e.g., "123" from row 460). The reviewing module 214 or the like functionality may also identify and return all characteristic ID's associated with the identified user profile ID, for example, using table 212 shown in FIG. 5 (e.g., "Woman" from row 560, and "Novice Programmer" from row 570).

A comparison module 216 or the like functionality is passed the content and the characteristic IDs identified by the reviewing module 214. This module 216 or the like functionality determines and returns a list of all instances where there are matches between the given content and the elements specified by one or more values in the "value column" 630 corresponding to the row of the identified characteristic ID from the characteristic table 213 shown in FIG. 6. For example, this process may include:

1. For each passed characteristic ID (e.g., "Woman" and "Novice Programmer" in the above example),
   a. For each row in table 213 with the given characteristic ID value in the characteristic ID column 610 (e.g., row 670 for "Woman")
      i. Identify the type of element from column 620 of the row (e.g., "Text" for row 670),
      ii. Identify the value of the element from column 630 of the row (e.g., "girl" for row 670),
      iii. Scan the given content and maintain a list of all occurrences of the given element.
2. Return the list of all identified occurrences, each entry of this list indicating both the characteristic ID and the element value, as well as the location of the occurrence in the content.

Thus, if the content included the sentence:

"To head the team, one girl was elected by the other team members", the comparison module 216 or the like functionality may return a list with at least one entry: one for each occurrence of the text string "girl" and each associated with the characteristic "Woman." One method of indicating the location of the strings may be using character offset (i.e., the number of characters from the first character). Thus, the comparison module 216 or the like functionality may return the following after processing the above example:

("Woman", "girl", text, 22).

An alert module 218 or the like functionality raises an alarm if the criteria is not met and identifies one or more of the parameters in the document that was not met for a respective recipient. The alert module 218 may also identify the location of the parameter in the document, email, or the like and provide an explanation of the reason the parameter did not meet the criteria. In addition, the alert process may provide one or more alternative contents for the document so that the parameter would meet the criteria. In one embodiment of the present disclosure, the alert module 218 may be passed the content along with a list indicating matches from the comparison module 216. The alert module 218 or the like functionality may perform the following procedure:

1. For each match from the list provided by the comparison module 216 or the like functionality, perform the following:
    a. Determine the row from table 213 matching both the characteristic ID and the element value (e.g., row 670 for ID="Woman" and value="girl");
    b. Retrieve any replacements for the given value from the replacements column 640 of this entry (e.g., "woman" for row 670), as well as the explanation from the explanation column 650 (e.g., "Demeaning and should only be used to refer to a child.")
    c. Locate the occurrence in the content;
    d. Highlight the occurrence (e.g., by underlining it);
Provide indication of both the explanation and any replacement values.

Thus, for the above example, the alert module 218 or the like functionality may provide the following alert, explanation and a replacement value:

Content alert for "girl" for JaneEDoe@bca.com (who is "Woman")

Explanation: Demeaning and should only be used to refer to a child.

Replacement(s): "woman" or "lady"
for the phrase,
"To head the team, one girl was elected by the other team members".

In one embodiment, the alert, explanation and/or replacement value may appear, for instance, as a pop-up window, when the highlighted text (e.g., "girl") in the phrase is selected or passed over, for instance, using a pointing device. A person of ordinary skill in art will appreciate techniques that may be used for presenting pop-up windows or like alerts upon selection and/or passing over of an item on a display, for instance, using a pointing device.

In row 690 of the characteristic table 213, the value of the element type is "Image." In particular, this row specifies that the image of a cloud representing a network may be inappropriate for recipients who are Novice Programmers because—as stated by the value in the row's 690 explanation column 650—this image is an "Iconic image which is only well known by experienced programmers." Given characteristic table 213 entries like this, the comparison module 216 or the like functionality may locate and tag instances of this image (e.g., clouds, in particular, in the case of row 690). In one embodiment of the present disclosure, given a row with an element type value of "Image," the comparison module 216 or the like functionality may also scan all graphic and video images for occurrences of the specified image. Whenever an instance of an offensive or inappropriate image is identified, the graphics or video containing the image is tagged to indicate this.

In one embodiment of the present disclosure, in response to the comparison module 216 or the like functionality coming across or encountering a characteristic table 213 entry whose element type equals "Image," the comparison module 216 scans all graphics and video contained in the authored content and records the occurrences of the specified image in response to finding that image. It does this just as it records text instances, by using the number of characters that precede the graphic or video. So, for example, if in a report after 12345 characters there is an image that contains a cloud, the comparison module 216 would return:

("Novice Programmer", "image of Internet cloud", image, 12345)

The comparison module 216 or the like functionality displays the content to the sender, and the alert module 218 or the like functionality may add an alert located before or next to the graphic or video in the similar manner as it does for occurrences of text elements. This alert may also indicate the particular offensive or inappropriate image (e.g., a network-representing cloud), an explanation of why the image is offensive or inappropriate, as well as replacement images, if any. So, for example, if the report mentioned above were addressed to a recipient who a novice programmer, the following content alert may appear before or near the instance of a graphic or video containing a cloud:

"Content alert for image of cloud for JaneEDoe@bca.com (who is "Novice Programmer")
Explanation: Iconic image which is only well known by experienced programmers.
Replacement(s): Image of cloud including "Network."

The system and method of the present disclosure may be also able to identify and provide alerts regarding offensive and inappropriate audio content. Take, for example, the case of row 700 from the characteristic table 213, which indicates that for Novice Programmers the audio "nubie" is a "Demeaning nickname." Similar to how it handles image content, the comparison module 216 or the like functionality handles such a characteristic table entry, one with an element type of "Audio", by reviewing all audio included in the content it is given, and searching for audio occurrences of the word "nubie." Note that one way the comparison module 216 or the like functionality can accomplish this is by first translating each piece of audio content into text, and then comparing the text version to the specified value (e.g., "nubie"). Then, whenever the comparison module 216 or the like functionality identifies matches, the comparison module 216 will log the fact the given match was found. So, for example, if there is an embedded audio file located after 54321 characters and the comparison module 216 or the like functionality translates the audio file into text and identifies the word "nubie," it may log and return the following match:

(Novice Programmer, "nubie", audio, 54321)

Then, given this match and the ID of the recipient, the alert module 218—in one embodiment of the present disclosure—may post the following content alert before the occurrences of the audio file:

"Content alert for audio "nubie" for JaneEDoe@bca.com (who is Novice Programmer)
Explanation: "Demeaning nickname".
Replacement(s): "novice"

The system and method of the present disclosure may also enable certain alerts to be suppressed based on the characteristics of the sender. In this embodiment of the system and method of the present disclosure, the reviewing module 214 not only retrieves and resolves the profile user ID and associated characteristic ID's of the recipient, but also retrieves and resolves the profile user ID and associated characteristic ID's of the sender. Similar to the recipient processing as described above, the reviewing module 214 or the like functionality determines the protocol user ID of the sender for the current transmission (e.g., JohnEDoe@foo.com). The reviewing module 214 or the like functionality then uses the table 211 (FIG. 4) to determine the profile user ID associated with this protocol user ID. For example, profile user ID "987" is associated with protocol JohnEDoe@foo.com from row 440 of table 211 (FIG. 4). The reviewing module 214 or the like functionality then uses table 212 (FIG. 5) to determine the one or more characteristic ID's associated with the profile user ID. For example, the characteristic ID "Novice Programmer" is associated with the profile user ID "987" by row 550 of table 212 (FIG. 5).

The comparison module 216 or the like functionality, in addition to performing the tasks described above, may use a characteristic table like that shown FIG. 7. The table, shown in FIG. 7 has an additional column, for example, Override Characteristic ID column (820, FIG. 7). In this embodiment, the comparison module 216 or the like functionality is passed the content, the characteristic IDs of the recipient, and the characteristic IDs of the sender (for example, identified by the reviewing module 214). The comparison module 216 or the like functionality determines and returns a list of all instances where there are matches between the given content and the elements specified by a value in a row from the characteristic table 213 where the recipient's characteristic ID matches, one that is not overridden by one of the sender's. Specifically, this process may include the following steps:

1. For each passed characteristic ID (e.g., "Woman" and "Novice Programmer" for the above example) of the recipient,
    a. For each row in table 213 (FIG. 7) whose characteristic ID column 810 value matches this characteristic ID
        i. if one of the sender's characteristic IDs matches the value of this row in the Override Characteristic ID column 820 (e.g., how the sender's "Novice Programmer" characteristic matches "Novice Programmer" in column 820 of row 890),
            1. Continue on to next matching row (if any).
        ii. Otherwise (as with row 870 where there is no such match):
            1. Identify the type of element from column 830 of the row (e.g., "Text" for row 870),
            2. Identify the value of the element from column 840 of the row (e.g., ["GC" for row 870),
            3. Scan the given content and maintain a list of all occurrences of the given element.
2. Return the list of all identified occurrences. Each entry of this list may indicate the characteristic ID and the element value, as well as the location of the occurrence in the content.

Thus, in the above example, the returned list of content occurrences will not include cases where the sender's associated characteristic ID's match those listed in the Override Characteristic ID column 820 of the characteristics table 213 (FIG. 7) in this embodiment.

The alert module or the like functionality may receive the returned list and process it, for example, according to the method described above with reference to FIG. 6 and functionalities of the alert module.

The document or content of the electronic communication may be augmented to include one or more indications, or matches detected by the comparison module 216 or the like functionality, of the profiles of the one or more recipients. Sender receives an alert generated by the alert module 218 or the like functionality, and the sender then may have the option to make the change or ignore it. For instance, the alert may pertain to one of many recipients and the sender may find the explanation given in column 650 of table 213 (FIG. 6) to not have enough significance to merit a change to the content. Another example of an instance, in which the sender may decide to ignore an alert, may be for communications written or created to purposely include the tagged content. For example, the sender may compose a communication in French to send to an English speaking recipient, knowing that the recipient is attempting to learn French.

A sender may mark any of the profile parameters listed in the characteristic I) column 520 of table 212 and associated with a current, specific recipient as private or shared. The option to share or not may be determined on a case by case basis and need not be stored in the database. Before the communication is transmitted, the sender may be prompted to select which parameters will be exposed (i.e., revealed) to the respective recipient(s). Private profile parameters will not be revealed to the recipient while shared parameters will be. The default behavior is for all parameters to be private because a recipient could be offended by a categorization or characteristic ID defined by the sender. In other words, unless parameters are marked as shared and displayed upon receipt, a recipient is unaware of the fact that the content of the communication was reviewed and the criterion used to do so.

The parameters can be exposed along with the original communication or as a separate, additional communication. A recipient may then edit shared profile parameters or add new ones, for instance, and send back to the sender the edited profile parameters and/or directly update a profile in the profile database, for instance, if the profile parameters are incorrect or have changed. These updates are stored for future communications sent to that recipient.

Referring to FIG. 2, a transmission device 220, such as a personal computer, personal data assistant, a mobile phone or like delivers the content, e.g., email, email attachments, text message, or any other electronic communication content or like to the recipients. The transmission device is connected to a network such as the Ethernet LAN, WAN, Internet, WIFI or other wireless network. The transmission device delivers the content to the one or more recipients who are also connected to the network. In one aspect, if the recipient is not connected to the network, the transmission device 220 may deliver the electronic communication as a tangible rendering, for example, to a printer to printout or a recorder to record in memory, disks, etc. which can be delivered to the one or more recipients, for example, by automatically pushing the communication to the receiving device or by the recipient manually pulling the data from the recorder.

In one aspect, the recipient may further forward the message, i.e., content received from the sender to another recipient. The forwarding of a message activates a comparison between the original content parameters and profile parameters owned by the original author. For example, person A sends a message to person B who later forwards the message to person C. Person A has sets of profile parameters for both persons B and C. These profiles are very different, and person A would not want to send the same content to both B and C. So, when person B attempts to forward the message from person A to person C, a comparison is done between person A's profile parameters for person C and content parameters of the original message from person A. If all criteria are not met, then person A receives an alert.

For instance, continuing with the above example, person B, a recipient, has the similar system shown in FIG. 2. In response to person B attempting to forward the same content received from person A to person C, the comparison module at person B's system is activated to compare Person A's profile parameters for person C with the original message from person A.

As will he appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
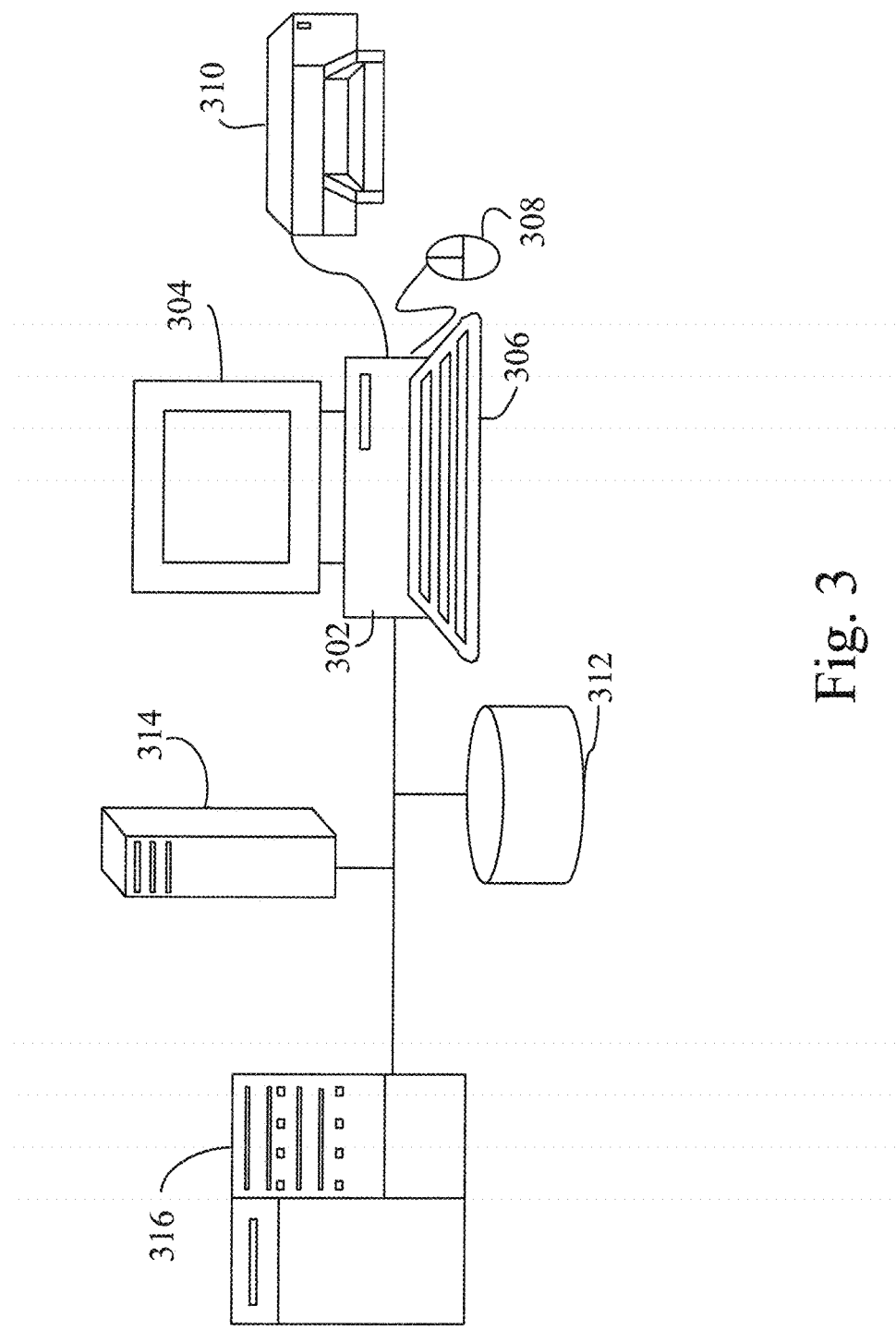
FIG. 3 illustrates an example of a computer system for carrying out systems and methodologies of the present disclosure.

Referring now to FIG. 3, the systems and methodologies of the present disclosure may be carried out or executed in a computer system that includes a processing unit 302, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 302 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 304 for presenting output displays and providing a display through which the user may input data and interact with the processing system, for instance, in cooperation with input devices such as the keyboard 306 and mouse device 308 or pointing device. The computer processing system may be also connected or coupled to one or more peripheral devices such as the printer 310, scanner (not shown), speaker, and any other devices, directly or via remote connections. The computer processing system may be connected or coupled to one or more other processing systems such as a server 310, other remote computer processing system 314, network storage devices 312, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 302, 314, 318), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer system for detecting content, comprising:
    an input device for inputting content by a sender to be sent to one or more recipients via a communications network;
    a profile database having one or more profiles associated with at least one of the one or more recipients, each profile of the one or more profiles having at least one profile characteristic describing a respective recipient;
    a reviewing module operable to determine at least one recipient profile characteristic associated with a recipient of the content from said one or more profiles;
    a comparison module operable to scan the content, determine one or more criteria based on said at least one recipient profile characteristic, and identify one or more content items in the content meeting said one or more criteria; and
    an alert module operable to raise an alarm to the sender prior to the content is sent to the one or more recipients, in response to the comparison module identifying said one or more content items,
    wherein the content includes electronic communications message between the sender of the content and said one or more recipients, said one or more profiles including sender defined parameters updatable as said sender learns more characteristics of said one or more recipients, said parameters further including associated explanations, and wherein the comparison module is operable to scan the content before the content is sent from the sender of the electronic communications message to said one or more recipients, and if it is determined that the content should not be sent based on the comparison module identifying said one or more content items, an explanation of why the content should not be sent is provided to the sender of the electronic communications message based on said associated explanations,
    wherein the sender is enabled to mark said one or more profiles as private or shared,
    wherein the recipient is enabled to edit one or more shared profiles.

2. The system of claim 1, wherein the comparison module further identifies the location of the one or more content items in the content.

3. The system of claim 1, wherein the alert module is further operable to provide said one or more criteria and an explanation for said one or more criteria.

4. The system of claim 1, wherein the alert module further provides one or more alternative contents in place of using said one or more content items.

5. The system of claim 1, further including a transmission device that delivers the content to the one or more recipients.

6. The system of claim 5, wherein the transmission device delivers a tangible rendering of the content.

7. The system of claim 6, wherein the tangible rendering includes a printout or a recording or combination thereof.

8. The system of claim 5, wherein the system is connected to a network.

9. The system of claim 8, wherein the one or more recipients are connected to the network, and the transmission device delivers the content to the one or more recipients via the network.

10. The system of claim 1, wherein said one or more criteria include one or more items considered to be offending to recipient of the content.

11. The system of claim 9, wherein the sender is enabled to mark said one or more profiles as private or shared.

12. The system of claim 11, wherein said one or more profiles marked as private are not exposed to the recipient.

13. The system of claim 11, wherein said one or more profiles marked as shared are exposed to the recipient.

14. A computer system for detecting content, comprising:
an input device for inputting content by a sender to be sent to one or more recipients via a communications network;
a profile database having one or more profiles associated with at least one of the one or more recipients, each profile of the one or more profiles having at least one profile characteristic describing a respective recipient;
a reviewing module operable to determine at least one recipient profile characteristic associated with a recipient of the content from said one or more profiles;
a comparison module operable to scan the content, determine one or more criteria based on said at least one recipient profile characteristic, and identify one or more content items in the content meeting said one or more criteria; and
an alert module operable to raise an alarm to the sender prior to the content is sent to the one or more recipients, in response to the comparison module identifying said one or more content items,
wherein the content includes electronic communications message between the sender of the content and said one or more recipients, said one or more profiles including sender defined parameters updatable as said sender learns more characteristics of said one or more recipients, said parameters further including associated explanations, and wherein the comparison module is operable to scan the content before the content is sent from the sender of the electronic communications message to said one or more recipients, and if it is determined that the content should not be sent based on the comparison module identifying said one or more content items, an explanation of why the content should not be sent is provided to the sender of the electronic communications message based on said associated explanations,
a transmission device that delivers the content to the one or more recipients, wherein the transmission device delivers a tangible rendering of the content,
wherein the system and the one or more recipients are connected to a network, and the transmission device delivers the content to the one or more recipients via the network,
wherein the sender is enabled to mark said one or more profiles as private or shared,
wherein the recipient is enabled to edit one or more shared profiles.

15. The system of claim 14, wherein the recipient edited shared profiles are received at the sender.

16. The system of claim 1, wherein in response to the recipient forwarding the content to another recipient, the comparison module and the review module are operable to be activated to review and compare the content based on one or more profile characteristics of the another recipient.

17. A method for detecting content, comprising:
determining by a processor at least one recipient profile characteristic associated with a recipient of electronic content, by retrieving one or more profiles stored in a profile database associated with one or more recipients;
determining one or more criteria based on said at least one recipient profile characteristic;
scanning the content;
identifying one or more content items in the content meeting said one or more criteria; and
raising an alarm to the sender of the content in response to the identifying of said one or more content items,
wherein the content includes electronic communications message between the sender of the content and said one or more recipients, said one or more profiles including sender defined parameters updatable as said sender learns more characteristics of said one or more recipients, said parameters further including associated explanation, and wherein the content is scanned before the content is sent from the sender of the electronic communications message to said one or more recipients, and if it is determined that the content should not be sent based on said identifying of said one or more content items, an explanation of why the content should not be sent is provided to the sender prior to the content is sent to the one or more recipients, based on said associated explanation,
wherein the sender is enabled to mark said one or more profiles as private or shared,
wherein the recipient is enabled to edit one or more shared profiles.

18. The method of claim 17, further including:
providing one or more alternatives to use in the content in place of said one or more content items.

19. The method of claim 17, wherein said one or more criteria include one or more items considered to be offending to the recipient.

20. A non-transitory program storage device readable by a machine, tangibly embodying a program of instructions executable by the machine to perform a method for detecting content, comprising:
determining by a processor at least one recipient profile characteristic associated with a recipient of electronic content, by retrieving one or more profiles stored in a profile database associated with one or more recipients;
determining one or more criteria based on said at least one recipient profile characteristic;
scanning the content;
identifying one or more content items in the content meeting said one or more criteria; and
raising an alarm to the sender prior to the content is sent to the one or more recipients, in response to the identifying of said one or more content items,
wherein the content includes electronic communications message between the sender of the content and said one or more recipients, said one or more profiles including sender defined parameters updatable as said sender learns more characteristics of said one or more recipients, said parameters further including associated explanation, and wherein the content is scanned before the content is sent from the sender of the electronic communications message to said one or more recipients, and if it is determined that the content should not be sent based on said identifying of said one or more content items, an explanation of why the content should not be sent is provided to the sender prior to the content is sent to the one or more recipients, based on said associated explanation,
wherein the sender is enabled to mark said one or more profiles as private or shared,
wherein the recipient is enabled to edit one or more shared profiles.

21. The program storage device of claim 20, further including:

provickling one or more alternatives to use in the content in place of said one or more content items.

22. The program storage device of claim 20, wherein said one or more criteria include one or more items considered to be offending to the recipient.

23. The program storage device of claim 20, wherein said sender defined parameters include one or more events that have occurred to said one or more recipients.

24. The program storage device of claim 20, wherein the recipient edited shared profiles are received at the sender.

25. The method of claim 17, wherein the recipient edited shared profiles are received at the sender.

* * * * *